United States Patent
Masakawa (10) Patent No.: US 10,795,589 B2
(45) Date of Patent: Oct. 6, 2020

(54) MEMORY SYSTEM AND MEMORY CONTROL METHOD

(71) Applicant: TOSHIBA MEMORY CORPORATION, Tokyo (JP)

(72) Inventor: Takahiro Masakawa, Itabashi Tokyo (JP)

(73) Assignee: TOSHIBA MEMORY CORPORATION, Tokyo (JP)

( * ) Notice: Subject to any disclaimer, the term of this patent is extended or adjusted under 35 U.S.C. 154(b) by 116 days.

(21) Appl. No.: 15/907,266

(22) Filed: Feb. 27, 2018

(65) Prior Publication Data

US 2019/0087106 A1 Mar. 21, 2019

(30) Foreign Application Priority Data

Sep. 20, 2017 (JP) ................. 2017-179922

(51) Int. Cl.
*G06F 3/06* (2006.01)

(52) U.S. Cl.
CPC ............ *G06F 3/0619* (2013.01); *G06F 3/061* (2013.01); *G06F 3/064* (2013.01); *G06F 3/0658* (2013.01); *G06F 3/0659* (2013.01); *G06F 3/0679* (2013.01)

(58) Field of Classification Search
CPC ........ G06F 3/0619; G06F 3/061; G06F 3/064; G06F 3/0658; G06F 3/0659; G06F 3/0679

See application file for complete search history.

(56) References Cited

U.S. PATENT DOCUMENTS

| | | | |
|---|---|---|---|
| 9,465,537 B2 | 10/2016 | Nishikubo et al. | |
| 2009/0089482 A1* | 4/2009 | Traister | G06F 12/0246 711/103 |
| 2012/0254698 A1* | 10/2012 | Ozer | G06F 11/106 714/764 |
| 2012/0311394 A1* | 12/2012 | Masuo | G06F 11/0727 714/746 |
| 2013/0173972 A1 | 7/2013 | Kubo | |
| 2015/0331625 A1* | 11/2015 | Nishikubo | G06F 3/06 711/103 |
| 2016/0225461 A1 | 8/2016 | Tuers et al. | |

* cited by examiner

*Primary Examiner* — Charles Rones
*Assistant Examiner* — Han V Doan
(74) *Attorney, Agent, or Firm* — Kim & Stewart LLP (57) ABSTRACT

A memory system includes a nonvolatile memory device and a controller circuit. The nonvolatile memory device includes a plurality of physical blocks, each including a storage area which is accessible in units of pages. The controller circuit is configured to control reading and writing of data which are performed on the plurality of physical blocks in units of pages. The controller circuit is also configured to execute a first process on the plurality of physical blocks by performing a second process of reading and a third process of data verification on a first page across each of the plurality of physical blocks and then performing the second process of reading and the third process of data verification on a second page across each of the plurality of physical blocks.

20 Claims, 7 Drawing Sheets

MEMORY SYSTEM AND MEMORY CONTROL METHOD

This application is based upon and claims the benefit of priority from Japanese Patent Application No. 2017-179922, filed Sep. 20, 2017, the entire contents of which are incorporated herein by reference.

FIELD

Embodiments described herein relate generally to memory systems and memory control methods.

BACKGROUND

In recent years, a memory system known as a solid-state drive (hereinafter referred to as an SSD) incorporating NAND flash memory having a three-dimensional structure has been used as a large-capacity storage. In the SSD, a phenomenon in which data stored in the NAND flash memory is degraded with time or due to read/write of data which is performed on a peripheral area can occur. Thus, in the SSD, a patrol process of reading data stored in the NAND flash memory and verifying the storage state of the read data is periodically executed.

DETAILED DESCRIPTION

An SSD that executes a patrol process on all the storage areas included in NAND flash memory takes a substantial amount of time to complete the patrol process. Thus, embodiments provide a memory system that can execute a patrol process on NAND flash memory efficiently.

In general, according to one embodiment, a memory system includes a nonvolatile memory device and a controller circuit. The controller circuit is configured to control reading and writing of data which are performed on the plurality of physical blocks in units of pages. The controller circuit is also configured to execute a patrol process on the plurality of physical blocks by performing a first process of reading and a second process of data verification on a first page across each of the plurality of physical blocks and then performing the first process of reading and the second process of data verification on a second page across each of the plurality of physical blocks.

Hereinafter, an embodiment will be described with reference to the drawings.

Configuration of a Memory System

Figure 1:
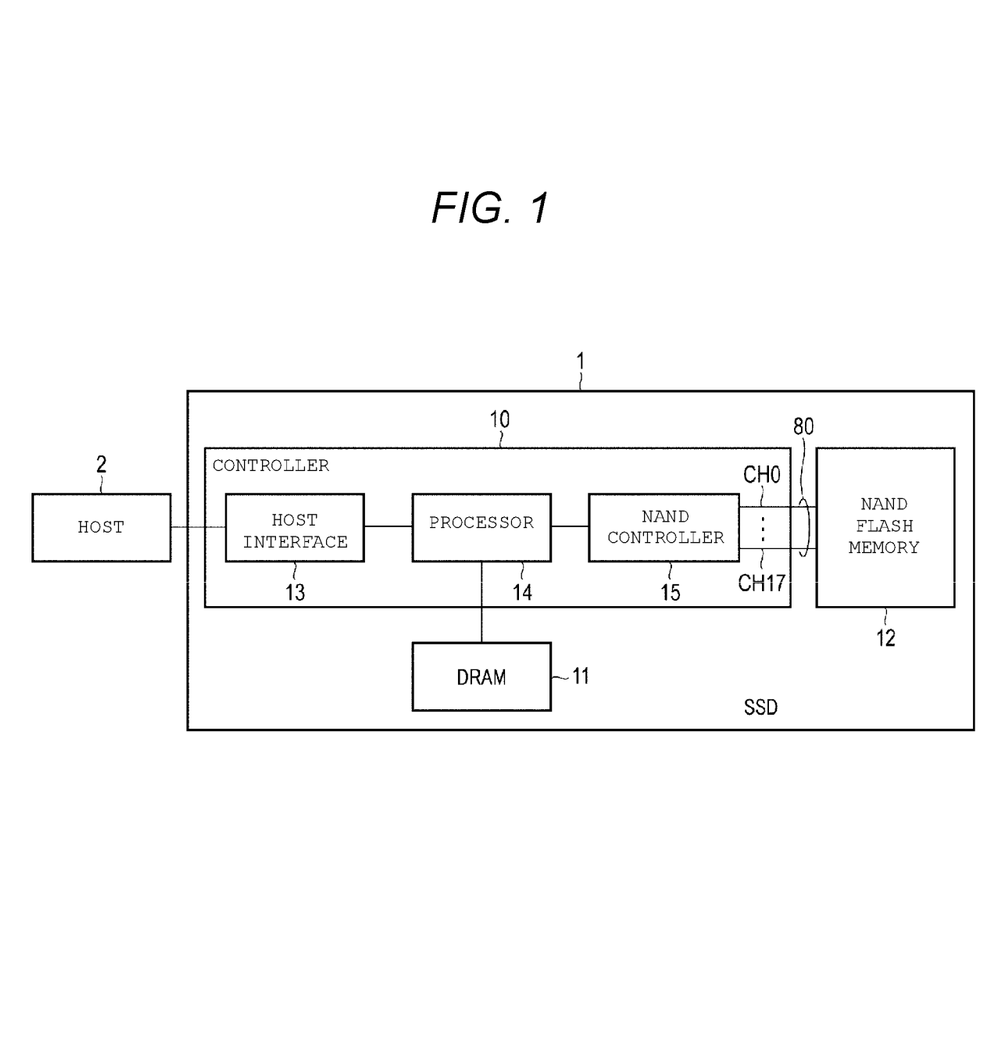
FIG. 1 is a block diagram depicting a configuration of a memory system according to an embodiment.

FIG. 1 is a block diagram depicting a configuration of a solid-state drive (SSD) 1 as a memory system of the present embodiment. The SSD 1 depicted in FIG. 1 stores data transmitted from a host 2 which is a computer, for example, into NAND flash memory and transmits data read from the NAND flash memory to the host 2.

The SSD 1 includes a controller 10, dynamic random access memory (DRAM) 11, and NAND flash memory (NAND-type flash memory) 12. The DRAM 11 is buffer memory which temporarily stores data such as write data or readout data which is written into or read from the NAND flash memory 12. As the buffer memory, instead of the DRAM, SRAM may be used or nonvolatile memory such as magnetoresistive random access memory (MRAM) may be used.

The controller 10 is configured as a circuit including a host interface 13, a processor 14, and a NAND controller 15. The host interface 13 controls a transmission of data, a command, and an address between the SSD 1 and the host 2. The processor 14 functions as a main controller, executes control of the DRAM 11 and the NAND controller 15, and executes a patrol process, a refresh process, a garbage collection process, and so forth which are related to the present embodiment.

As will be described later, the patrol process includes a read process of reading data from the NAND flash memory 12 and a verification process of verifying the read data. The refresh process is a process of rewriting valid data in a physical block into another physical block. The garbage collection process is a process also known as a compaction process and is a data reorganization process for securing a writable free physical block.

Here, a read operation included in the patrol process (hereinafter referred to the "patrol read process") is a voluntary data readout operation of the SSD 1 which is unrelated to a command from the host 2. Likewise, read operations included in the refresh process and the garbage collection process are also voluntary data readout operations of the SSD 1.

The controller 10 includes a plurality of channels 80 (CH0 to CH17) as an interface that transmits data in parallel between the NAND controller 15 and the NAND flash memory 12. The NAND controller 15 can transmit data to the NAND flash memory 12 in parallel via 18 channels 80 (CH0 to CH17), for example. That is, the NAND controller 15 can simultaneously read or write data in parallel from or into physical blocks, which will be described later. Based on control of the processor 14, in addition to data readout process and write process which are performed on the host 2, the NAND controller 15 executes data readout process and write process associated with the above-described patrol process, refresh process, or garbage collection process.

The NAND flash memory 12 is nonvolatile memory and includes a plurality of memory chips. As will be described later, each memory chip includes a plurality of physical blocks. Each physical block is the smallest storage area unit on which erasing process can be independently performed in the NAND flash memory 12. The physical block is configured with a plurality of physical pages. Each physical page is the smallest unit of read and write (programming) of data which are performed on the NAND flash memory 12.

Configuration of the NAND Flash Memory

Figure 2:
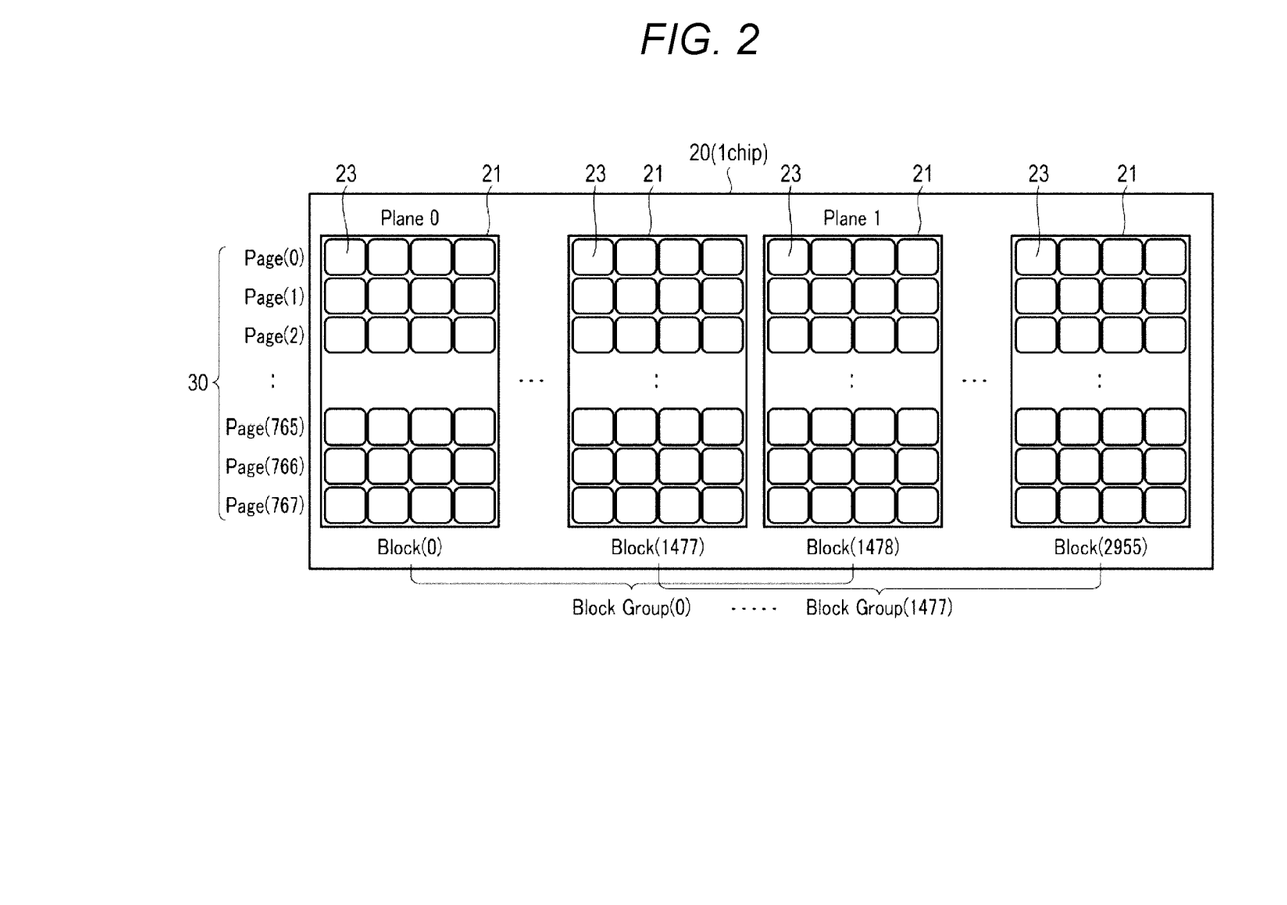
FIG. 2 is a diagram for explaining a configuration of a physical block according to the embodiment.

Hereinafter, a configuration of the NAND flash memory 12 will be described with reference to FIGS. 2 to 6. As depicted in FIG. 2, one memory chip 20 (1chip) includes a plurality of physical blocks 21. As described earlier, one physical block 21 is the smallest storage area unit on which erasing process can be independently performed. In the following physical or logical configuration which will be described by using the drawings, each number of component elements is an example and is not limited to a value described therein.

One memory chip 20 includes, for example, 2956 physical blocks (for the sake of convenience, Block(0) to Block (2955) are set). Moreover, in connection with a configuration of a logic block, which will be described later, a logical combination of one physical block 21 of one plane (e.g., Plane 0) and one physical block 21 of another plane (e.g., Plane 1) is defined as one physical block group (Block Group). One memory chip 20 includes, for example, 1478 physical block groups (for the sake of convenience, Block Group(0) to Block Group(1477) are set).

Figure 3:
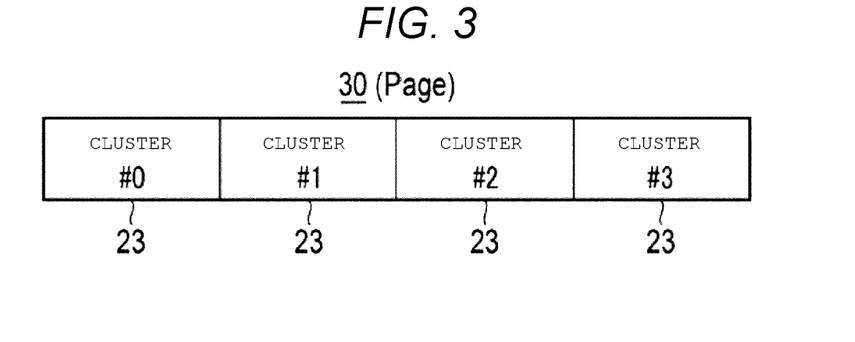
FIG. 3 is a diagram for explaining a configuration of a cluster according to the embodiment.

As depicted in FIG. 2, one physical block 21 includes, for example, 768 pages 30 (for the sake of convenience, Page(0) to Page(767) are set). Here, as depicted in FIG. 3, one page 30 includes, for example, 4 clusters 23 (clusters #0 to #3). In this case, since one physical block 21 includes 768 pages×4 clusters=3072 clusters, the physical block 21 has a storage capacity corresponding to 3072 clusters.

Figure 4:
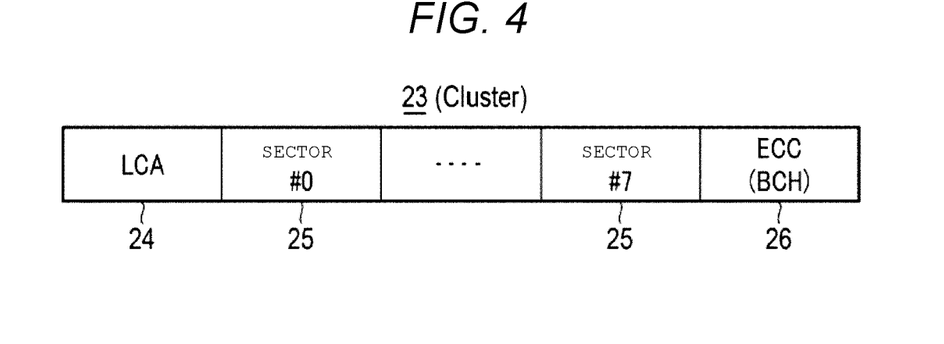
FIG. 4 is a diagram for explaining a configuration of a page according to the embodiment.

FIG. 4 is a diagram depicting the configuration of one cluster 23. As depicted in FIG. 4, one cluster 23 includes, for example, management information containing a logical cluster address (LCA), 8 sectors (sectors #0 to #7) 25, and an error correcting code (ECC) 26. The cluster 23 is identified by the logical cluster address (LCA). As the ECC 26, a BCH code, for example, is used.

The sector 25 is the smallest data access unit to which access from the host 2 is made, and has a size of, for example, 512 bytes, 520 bytes, or 528 bytes. From one memory chip 20, the NAND controller 15 physically reads data in units of page, but logically can read data in units of cluster or sector.

Figure 5:
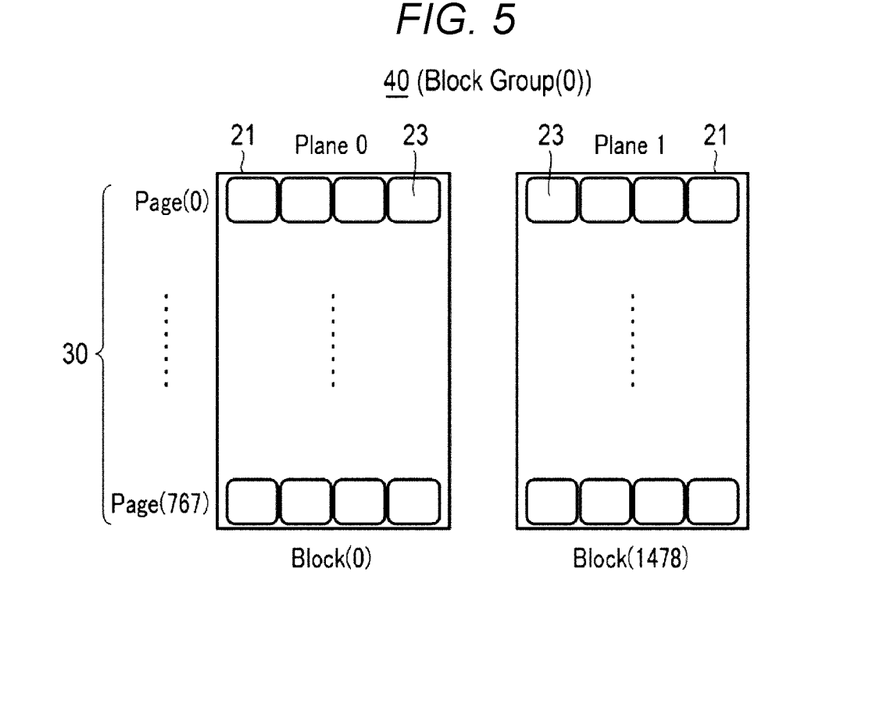
FIG. 5 is a diagram for explaining a configuration of a physical block group according to the embodiment.

Referring back to FIG. 2, a logical combination of one physical block 21 of one plane (Plane 0) and one physical block 21 of another plane (Plane 1) is defined as one physical block group 40. Specifically, as depicted in FIG. 5, for example, one physical block of Plane 0, Block(0), and one physical block of Plane 1, Block(1478), configure a physical block group 40 of Block Group(0). The physical block group 40 is a logical combination, and the physical block, Block(0), and the physical block, Block(1478), are disposed so as to be physically separated from each other. Since one physical block group 40 is "one physical block×2 planes" and includes 3072 clusters×2 planes=6144 clusters, the physical block group 40 has a storage capacity corresponding to 6144 clusters.

Figure 6:
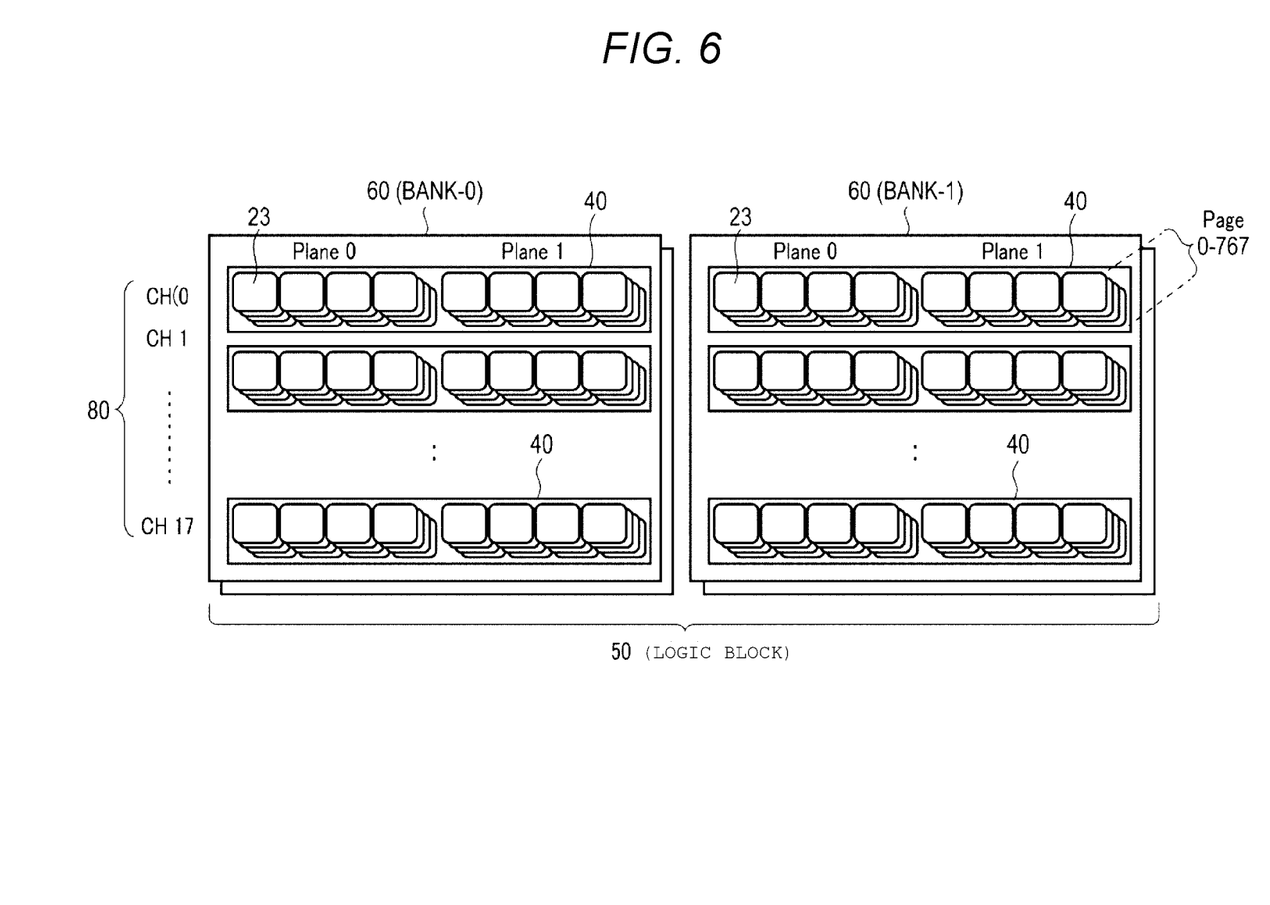
FIG. 6 is a diagram for explaining a configuration of a logic block according to the embodiment.

FIG. 6 is a diagram depicting the configuration of one logic block 50. One logic block 50 is a configuration in which a plurality of physical block groups 40 are grouped over a plurality of channels 80 (e.g., CH0-CH17) and a plurality of banks 60 (e.g., BANK-0 and BANK-1) 60. A plurality of physical block groups 40 may be grouped into one bank 60. Here, each physical block group 40 includes a logical combination of physical blocks 21 of planes (Plane 0) and (Plane 1), each including 768 pages (Page(0) to Page(767)). Moreover, the NAND controller 15 switches between the two banks (BANK-0 and BANK-1) 60 by using a chip select signal CS selecting a memory chip 20, for example.

As described earlier, each physical block 21 included in each of the physical block groups 40 configuring one logic block 50 includes, for example, 768 pages 30 (Page(0) to Page(767)). Thus, since the logic block 50 includes one physical block group (3072 clusters)×18 channels×2 banks=221184 clusters, the logic block 50 has a storage capacity corresponding to 221184 clusters.

In the patrol process, which will be described later, the NAND controller 15 can read data in units of pages (for instance, data of Page(0)) from each physical block 21 of the physical block groups 40 of the bank (BANK-0) 60 simultaneously from the channels (CH0-CH17) 80 of the logic block 50 depicted in FIG. 6 in parallel. Likewise, the NAND controller 15 can read data in units of pages (for instance, data of Page(0)) from each physical block 21 of the physical block groups 40 of the bank (BANK-1) 60 simultaneously from the channels (CH0-CH17) 80 in parallel. In accordance with a command which is set, the NAND controller 15 can access the memory chip 20 to read data in units of planes or to read data simultaneously from a plurality planes (Plane 0 and Plane 1).

[Patrol Process]

Figure 7:
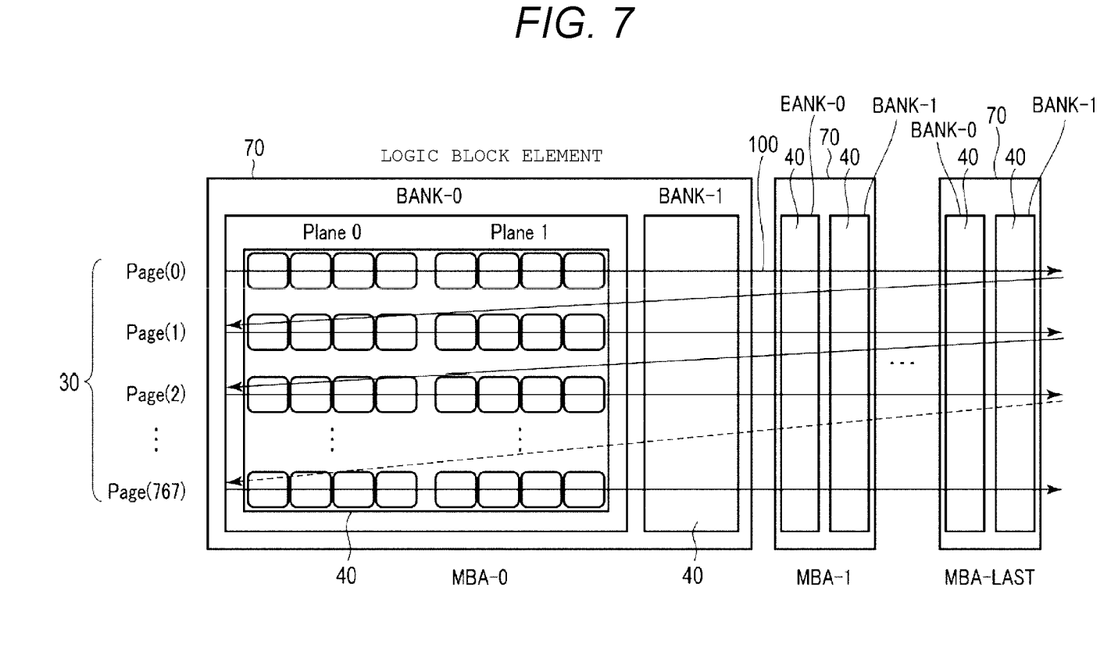
FIG. 7 is a diagram for explaining a patrol process according to the embodiment.
Figure 8:
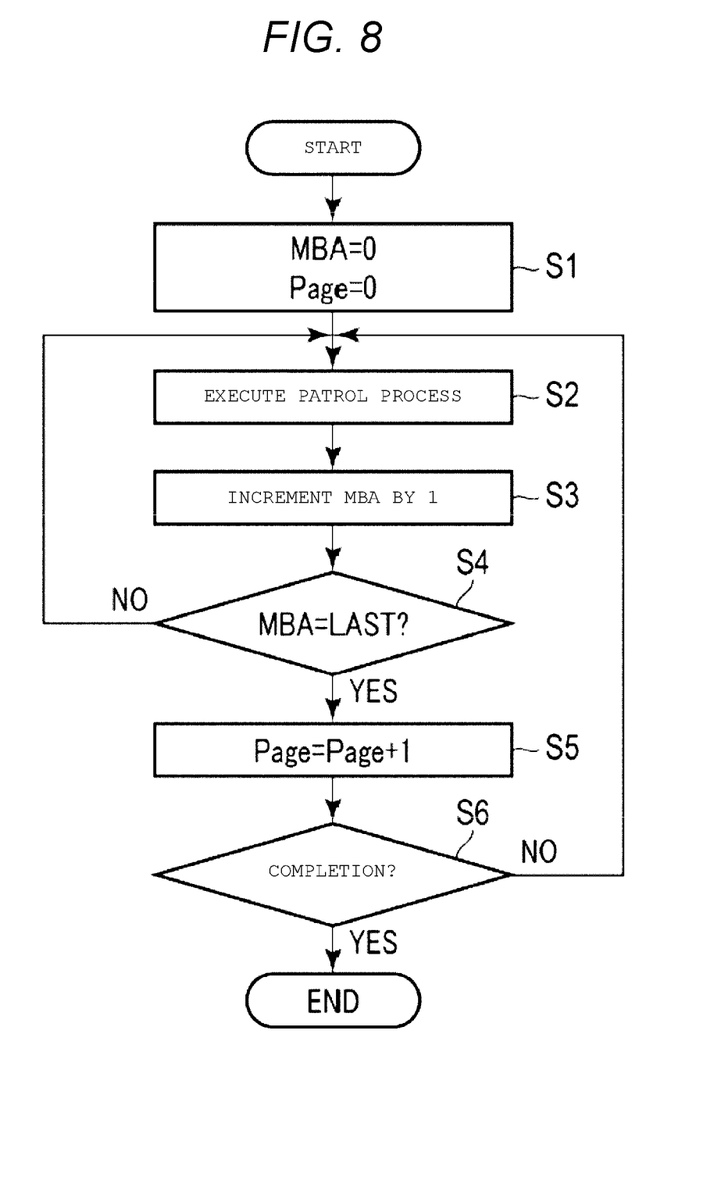
FIG. 8 is a flowchart for explaining a procedures of the patrol process according to the embodiment.

Next, the patrol process of the present embodiment will be described with reference to FIGS. 7 and 8. FIG. 7 is a diagram depicting all the logic block elements 70, which are connected to one channel 80 (for example, CH0) of the channels CH0-CH17, of the logic block 50. FIG. 8 is a flowchart for explaining the procedures of the patrol process.

As depicted in FIG. 7, each logic block element 70 is designated by a media block address (MBA). In this case, the MBA is configured with a plurality of addresses (MBA-0 to MBA-LAST). The address MBA-LAST means the last address of the MBA. Here, since "one physical block group×2 banks=4 physical blocks", the logic block element 70 (for example, the address (MBA-0)) of one channel CH0 includes four physical blocks 21, for example.

The controller 10 controls the NAND controller 15 in accordance with a command from the host 2 and executes a data read operation or write operation, which is performed on the NAND flash memory 12, in parallel for all the channels 80. The write operation includes programming a memory cell of the NAND flash memory 12.

Here, it is confirmed that a phenomenon in which data stored in the NAND flash memory 12 is degraded with time or due to read/write of data which is performed on a peripheral area can occur. Thus, the controller 10 regularly executes the patrol process on the NAND flash memory 12 and checks the storage state (e.g., quality) of the stored data.

In the present embodiment, the patrol process includes a process of reading data from all the physical blocks 21 of the NAND flash memory 12 in units of pages and a process of verifying the data. These processes may be collectively referred to as a patrol read process. Instead of checking an error rate, the patrol read process may be a check as to whether or not, for example, the read data could be correctly read or a correction was successfully made. Moreover, the patrol read process may restrict a read retry involving an ECC (including a process of, for example, increasing the intensity or characteristics or changing a threshold value).

Based on the verification result of the patrol process, if the error rate or number of errors in the physical block 21 is beyond a tolerance level, the controller 10 proceeds to make a reservation for the refresh process. The refresh process is a process of rewriting valid data in units of pages in one physical block 21 into another physical block 21. Unlike the garbage collection process, the refresh process executes an operation of rewriting valid data of one physical block 21 into another physical block 21 without collecting valid data of a plurality of physical blocks 21. The controller 10 collectively executes the reserved refresh process in units of pages after the completion of the patrol read process of all the physical blocks 21.

In the present embodiment, the controller 10 preferentially executes a read operation or a write operation in accordance with a command from the host 2 and executes the patrol process on all the physical blocks 21 (Block(0) to Block(2955)) of the NAND flash memory 12 on a regular basis except when the above read operation or write operation is executed. Specifically, as depicted in FIG. 7, the controller 10 executes the patrol read process of reading data in units of pages and verifying the data on the physical block groups 40 included in all the MBAs (MBA-0 to MBA-LAST) of each channel 80 with a higher priority given to the direction of the MBA than to the direction of the page 30 (see a process direction 100). Here, the logic block element 70 (for instance, the address (MBA-0)) of one channel, CH0, includes four physical blocks 21 in two banks, BANK-0 and BANK-1.

The procedures of the patrol process will be described with reference to FIG. 8. As shown in FIG. 8, the controller 10 sets, as an initial setting, the MBA of the logic block element 70 at the first address (MBA-0) and sets the page number at the first page (i.e., Page(0) of Pages(0)-(767)) (S1). The controller 10 executes the patrol process in units of pages, covering Page(0) of each physical block 21 of the MBA-0 (S2).

Here, as described earlier, FIG. 7 depicts the logic block elements 70 of the MBA-0 to the MBA-LAST of one channel (for example, CH0). In actuality, the NAND controller 15 reads data of 4 clusters in units of pages from Page(0) of the physical block 21 (in this case, Block(0)) of the physical block group 40 of the bank 60 (Bank-0) and verifies the data simultaneously for all the channels 80 (CH0 to CH17) in parallel. In a similar manner, the NAND controller 15 reads data of 4 clusters in units of pages from Page(0) of the physical block 21 (in this case, Block(1478)) of the physical block group 40 of the bank 60 (Bank-0) and verifies the data. The physical block, Block(0), and the physical block, Block(1478), which are included in the physical block group 40 of the bank 60 (Bank-0) are disposed so as to be physically separated from each other (see FIG. 2).

Here, the controller 10 executes, for each of the channels 80 (CH0 to CH17), the patrol process on each of the logic block elements 70 connected to all the channels 80. The controller 10 sets the MBA of the logic block element 70 at a next address (MBA-1) by incrementing the MBA by 1 (S3) and executes the above-described patrol process (S2). The controller 10 continues the patrol process in Page(0) until the controller 10 completes the patrol process of each physical block 21 of the last address (MBA-LAST) of the logic block elements 70 (NO in S4). If the controller 10 completes the patrol process for Page(0) (YES in S4), the controller 10 increments the current page number by 1 (S5). Specifically, the controller 10 sets, from the page numbers (Pages(0)-(767)), a next page number (Page(1)) obtained by incrementing the page number (Page(0)) by 1 (S5).

In a similar manner, the controller 10 executes, for each of the channels 80 (CH0 to CH17), the patrol process on each of the logic block elements 70 connected to all the channels 80. The controller 10 sets the MBA of the logic block element 70 at a next address (MBA-1) by incrementing the MBA by 1 (S3) and executes the above-described patrol process (S2). The controller 10 continues the patrol process in Page(1) until the controller 10 completes the patrol process of each physical block 21 of each of the logic block elements 70 from the first address (MBA-0) to the last address (MBA-LAST) (NO in S4). If the controller 10 completes the patrol process for Page(1) (YES in S4), the controller 10 increments the current page number by 1 (S5). Specifically, the controller 10 sets, from the page numbers (Pages(0)-(767)), a next page number (Page(2)) obtained by incrementing the page number (Page (1)) by 1 (S5). The controller 10 repeats the above-described process, and, if the controller 10 completes the patrol process of each physical block 21 of each of the logic block elements 70 of the last address (MBA-LAST) in the last page number (Page(767)), the controller 10 ends the patrol process performed on all the physical blocks 21 (YES in S6).

As described above, according to the present embodiment, in each of the set page numbers (Pages(0)-(767)), the patrol process in units of pages for each physical block 21 is executed simultaneously on all the channels 80 (CH0 to CH17) in parallel with a higher priority given to the direction of the MBA than to the direction of the pages. That is, after the patrol process is executed in the direction of the MBA, the patrol process is executed in the direction of the page 30, and this is repeatedly performed (see the process direction 100 of FIG. 7). In other words, in the present embodiment, after the patrol process is executed for only on one page of all the pages (Pages(0)-(767)) of each physical block 21 included in the logic block element 70, the patrol process sequentially proceeds to the next logic block element 70, and the patrol process is executed for only on one page of each physical block 21 included in each of the logic block elements 70. This is continuously performed until the patrol process of all the pages of each physical block 21 of all the logic block elements 70 is completed.

Therefore, as compared to an conventional method in which the patrol process is executed with a priority given to the page direction in each physical block included in each logic block element, the method of the present embodiment can perform the patrol process of each physical block efficiently at high speed in all the logic block elements. Specifically, in the conventional method, since the patrol process is executed in order on all the pages of each of the physical blocks included in the logic block element, it may take a substantial amount of time to complete the patrol process of the logic block element including a physical block with a physical defect, for example. By contrast, with the method of the present embodiment, by preferentially executing the patrol process on the same page of each physical block, the patrol process in all the logic block elements can be completed in a short amount of time.

Hereinafter, the effects of the present embodiment will be specifically described.

For the sake of convenience, attention is focused on the physical block group 40 (Plane 0 and Plane 1) of the bank 60 (BANK-0) in Page(0) of the logic block element (MBA-0) 70 depicted in FIG. 7. In this physical block group 40, the physical block 21 of Plane 0 (Block(0)) and the physical block 21 of Plane 1 (Block(1478)) are disposed so as to be physically separated from each other. Thus, the degree of quality correlation between the physical blocks 21 is low.

That is, in the conventional method, since the patrol process is executed with a priority given to the direction of the page number in each physical block, an unnecessary patrol process is executed on areas having a high degree of quality correlation in the same physical block. By contrast, in the present embodiment, since the patrol process in the direction of physical blocks having a low degree of quality correlation is preferentially executed, the patrol process of areas having a high degree of quality correlation can be omitted, which results in an enhancement of the speed and efficiency of the patrol process.

In other words, according to the present embodiment, an enhancement of the speed and efficiency of the patrol process which is executed on a regular basis can be achieved.

The present embodiment deals with a case in which, as depicted in FIG. 7, the patrol process is successively executed in the direction of the MBA for all the page numbers, but a higher priority may be given to a user data read operation or write operation which is executed in accordance with a command from the host 2. Thus, the patrol process may not be successively executed for all the page numbers, but executed intermittently for each page number or each physical block 21, for example.

Modified Example

Figure 9:
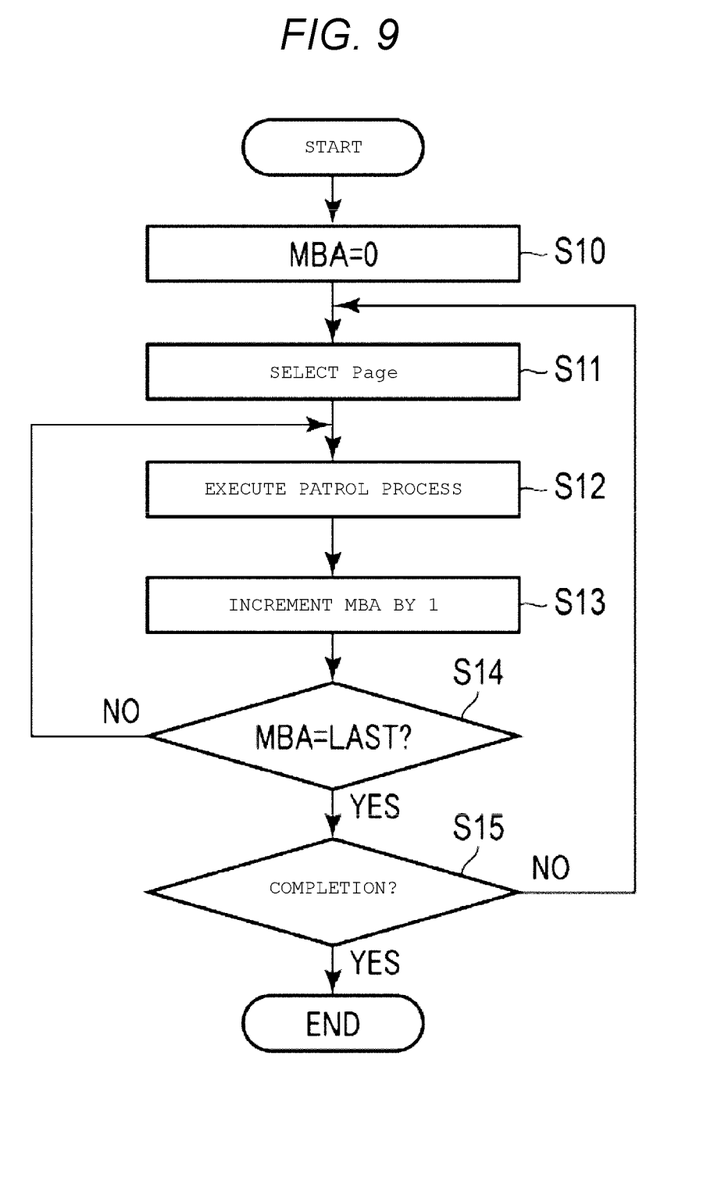
FIG. 9 is a flowchart for explaining a procedures of a patrol process according to a modified example of the embodiment.

FIG. 9 is a flowchart for explaining the procedures of the patrol process according to a modified example of the present embodiment.

The patrol process shown in FIG. 8 adopts the procedures in which, as an initial setting, the page number is set at Page(0) (S1) and the page number is sequentially changed to a next page number (S5). By contrast, this modified example adopts the procedures in which the page numbers (Pages (0)-(767)) are set in no particular order.

As shown in FIG. 9, the controller 10 sets, as an initial setting, the MBA of the logic block element 70 at the first address (MBA-0) (S10). Next, the controller 10 selects, as the page number of any Page (N) from Pages(0)-(767) (S11). Here, the selected Page(N) may be Page(0). The controller 10 executes the patrol process in units of pages from Page(N) (in this case, Page(0)) of each physical block 21 of the MBA-0 (S12).

Here, as described earlier, the controller 10 executes, for each of the channels 80 (CH0 to CH17), the patrol process on the logic block elements 70 connected to all the channels 80. The controller 10 sets the MBA of the logic block element 70 at a next address (MBA-1) by incrementing the MBA by 1 (S13) and executes the above-described patrol process (S12). The controller 10 continues the patrol process until the controller 10 completes the patrol process of each physical block 21 of the last address (MBA-LAST) of the logic block elements 70 in Page(0) (NO in S14).

If the controller 10 completes the patrol process for Page(0) (YES in S14), the controller 10 determines whether or not the controller 10 completes the patrol process of all the physical blocks 21 (S15). If the controller 10 has not completed the patrol process (NO in S15), the controller 10 selects a next page number (for example, (Page(767)) from unselected page numbers (Page(1)-(767)) (S11). Here, as a next page number, the controller 10 may select, in no particular order, a page number corresponding to an area on which a determination is made that the area has the lowest degree of quality correlation in the same physical block 21. Specifically, for example, if the previous page number is Page(0), the controller 10 selects Page(767) as a page number corresponding to an area having the lowest degree of quality correlation in the same physical block 21.

In a similar manner, the controller 10 continues the patrol process on Page (767) until the controller 10 completes the patrol process of each physical block 21 of the last address (MBA-LAST) of the logic block elements 70 (NO in S14). If the controller 10 completes the patrol process of each physical block 21 of the last address (MBA-LAST) of the logic block elements 70 on the last page number selected (for example, Page(1)), the controller 10 ends the patrol process performed on all the physical blocks 21 (YES in S15).

Also in the modified example described above, as in the case of the present embodiment, since an enhancement of the speed and efficiency of the patrol process which is executed on a regular basis can be achieved, a correction process can be reliably executed within a required period of time.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising:
a nonvolatile memory device having a physical storage area that includes a first bank and a second bank, each of the first and second banks including a first plane and a second plane, each of the first and second planes including a plurality of physical blocks, and each of the physical blocks including a plurality of pages, wherein one physical block is a unit of erasing and one page is a unit of reading and writing; and
a controller circuit configured to execute a patrol process on each of the plurality of pages of each of the plurality of physical blocks of each of the first and second planes of each of the first and second banks in the nonvolatile memory device by repeatedly performing a first process on one page across each of the plurality of physical blocks of each of the first and second planes of each of the first and second banks sequentially for each of the plurality of pages, a sequence of the first processes including a second process of reading and a third process of data verification on a first page across each of the plurality of physical blocks of each of the first and second planes of each of the first and second banks and then the second process of reading and the third process of data verification on a second page across each of the plurality of physical blocks of each of the first and second planes of each of the first and second banks, wherein
during the first process, the controller circuit performs the third process of data verification through a plurality of channels wherein data verification is performed on a plural number of physical blocks in parallel.

2. The memory system according to claim 1, wherein the first page is identified by a first page number across each of the plurality of physical blocks of each of the first and second planes of each of the first and second banks, and the second page is identified by a second page number, that is different from the first page number, across each of the plurality of physical blocks of each of the first and second planes of each of the first and second banks.

3. The memory system according to claim 1, wherein
through the plurality of channels the controller circuit performs control of reading and writing of data in a unit of page, wherein
during the first process, the controller circuit performs the second process of reading through the plurality of channels wherein reading is performed on a plural number of physical blocks in parallel.

4. The memory system according to claim 3, wherein the second process of reading and the third process of data verification are performed sequentially across a plurality of logic blocks, each of the logic blocks including at least one physical block controlled through each of the channels.

5. The memory system according to claim 4, wherein
said at least one physical block of each logic block controlled through each of the channels includes one physical block from the first plane of the first bank, one physical block from the second plane of the first bank, one physical block from the first plane of the second bank, and one physical block from the second plane of the second bank.

6. The memory system according to claim 1, wherein
the controller circuit makes a reservation for a refresh process based on a result of the third process and executes the refresh process after the completion of the second and third processes on each of the pages of the plurality of physical blocks of each of the first and second planes of each of the first and second banks.

7. The memory system according to claim 1, wherein
the controller circuit executes a process of reading or writing data from or into the nonvolatile memory device in accordance with a command from a host, and executes the first process during a period in which the controller circuit does not execute the process of reading or writing data from or into the nonvolatile memory device in response to the command from the host.

8. The memory system according to claim 7, wherein the controller circuit suspends the patrol process upon receiving the command, and resumes the patrol process upon completion of the process of reading or writing data in accordance with the command.

9. A controlling method of a memory system including a nonvolatile memory device having a physical storage area that includes a first bank and a second bank, each of the first and second banks including a first plane and a second plane, each of the first and second planes including a plurality of physical blocks, and each of the physical blocks including a plurality of pages, wherein one physical block is a unit of erasing and one page is a unit of reading and writing, the method comprising:
executing a patrol process on each of the plurality of pages of each of the plurality of physical blocks of each of the first and second planes of each of the first and second banks in the nonvolatile memory device by repeatedly performing a first process on one page across each of the plurality of physical blocks of each of the first and second planes of each of the first and second banks sequentially for each of the plurality of pages, a sequence of the first processes including a second process of reading and a third process of data verification on a first page across each of the plurality of physical blocks of each of the first and second planes of each of the first and second banks and then performing the second process of reading and the third process of data verification on a second page across each of the plurality of physical blocks of each of the first and second planes of each of the first and second banks, wherein
during the first process, the third process of data verification is performed through a plurality of channels wherein data verification is performed on a plural number of physical blocks in parallel.

10. The method according to claim 9, wherein the first page is identified by a first page number across each of the plurality of physical blocks of each of the first and second planes of each of the first and second banks, and the second page is identified by a second page number, that is different from the first page number, across each of the plurality of physical blocks of each of the first and second planes of each of the first and second banks.

11. The method according to claim 9, wherein
control of reading and writing of data in the unit of page is performed through the plurality of channels, wherein
during the first process, the second process of reading is performed through the plurality of channels wherein reading is performed on a plural number of physical blocks in parallel.

12. The method according to claim 11, wherein the second process of reading and the third process of data verification are performed sequentially across a plurality of logic blocks, each of the logic blocks including at least one physical block controlled through each of the channels.

13. The method according to claim 12, wherein
said at least one physical block of each logic block controlled through each of the channels includes one physical block from the first plane of the first bank, one physical block from the second plane of the first bank, one physical block from the first plane of the second bank, and one physical block from the second plane of the second bank.

14. The method according to claim 9, further comprising:
making a reservation for a refresh process based on a result of the third process; and
executing the refresh process after the completion of the second and third processes on each of the pages of the plurality of physical blocks of each of the first and second planes of each of the first and second banks.

15. The method according to claim 9, further comprising:
executing a process of reading or writing data from or into the nonvolatile memory device in accordance with a command from a host, wherein
the first process is executed during a period in which the process of reading or writing data from or into the nonvolatile memory device in response to the command from the host is not being executed.

16. The method according to claim 15, further comprising:
suspending the patrol process upon receiving the command; and
resuming the patrol process upon completion of the process of reading or writing data in accordance with the command.

17. A memory system comprising:
a nonvolatile memory device having a physical storage area that includes a first bank and a second bank, each of the first and second banks including a first plane and a second plane, each of the first and second planes including a plurality of physical blocks, and each of the physical blocks including a plurality of pages, wherein one physical block is a unit of erasing and one page is a unit of reading and writing; and
a controller circuit configured to:

execute a patrol process on each of the plurality of pages of each of the plurality of physical blocks of each of the first and second planes of each of the first and second banks in the nonvolatile memory device by repeatedly performing a first process on one page across each of the plurality of physical blocks of each of the first and second planes of each of the first and second banks sequentially for each of the plurality of pages, a sequence of the first processes including a second process of reading and a third process of data verification on a first page across each of the plurality of physical blocks of each of the first and second planes of each of the first and second banks and then the second process of reading and the third process of data verification on a second page across each of the plurality of physical blocks of each of the first and second planes of each of the first and second banks; and make a reservation for a refresh process based on a result of the third process and execute the refresh process after the completion of the second and third processes on each of the pages of the plurality of physical blocks of each of the first and second planes of each of the first and second banks.

18. The memory system according to claim 17, wherein the first page is identified by a first page number across each of the plurality of physical blocks of each of the first and second planes of each of the first and second banks, and the second page is identified by a second page number, that is different from the first page number, across each of the plurality of physical blocks of each of the first and second planes of each of the first and second banks.

19. The memory system according to claim 17, wherein
through a plurality of channels the controller circuit performs control of reading and writing of data in a unit of page, wherein
during the first process, the controller circuit performs the second process of reading through the plurality of channels wherein reading is performed on a plural number of physical blocks in parallel.

20. The memory system according to claim 19, wherein the second process of reading and the third process of data verification are performed sequentially across a plurality of logic blocks, each of the logic blocks including at least one physical block controlled through each of the channels.

* * * * *